(12) United States Patent
Place et al.

(10) Patent No.: US 9,856,956 B2
(45) Date of Patent: Jan. 2, 2018

(54) ROD-AND-BRACKET CONNECTOR SYSTEM FOR SECURING A PIVOTING MEMBER TO A GUIDE ANCHOR MOVEABLY SECURED WITHIN A GUIDE TRACK

(71) Applicant: UNITED TECHNOLOGIES CORPORATION, Hartford, CT (US)

(72) Inventors: Emma J Place, New Hartford, CT (US); Donald W Peters, Colchester, CT (US)

(73) Assignee: United Technologies Corporation, Farmington, CT (US)

( * ) Notice: Subject to any disclaimer, the term of this patent is extended or adjusted under 35 U.S.C. 154(b) by 402 days.

(21) Appl. No.: 14/600,518

(22) Filed: Jan. 20, 2015

(65) Prior Publication Data

US 2016/0208893 A1 Jul. 21, 2016

(51) Int. Cl.
| | | |
|---|---|---|
| F16H 21/44 | (2006.01) |
| F16H 21/06 | (2006.01) |
| F02K 1/15 | (2006.01) |
| F02K 1/12 | (2006.01) |

(52) U.S. Cl.
CPC ............... *F16H 21/44* (2013.01); *F02K 1/12* (2013.01); *F02K 1/15* (2013.01); *F16H 21/06* (2013.01)

(58) Field of Classification Search
CPC . F16H 21/44; F16H 21/06; F02K 1/12; F02K 1/15
See application file for complete search history.

(56) References Cited

U.S. PATENT DOCUMENTS

| 2,928,234 | A | | 3/1960 | Brown | |
|---|---|---|---|---|---|
| 3,214,904 | A | * | 11/1965 | Bailey | F02K 1/1269 239/265.17 |
| 3,662,493 | A | | 5/1972 | Foltz | |
| 3,807,637 | A | * | 4/1974 | Camboulives | F02K 1/1223 239/265.41 |

(Continued)

FOREIGN PATENT DOCUMENTS

| EP | 0 512 822 | 11/1992 |
|---|---|---|
| GB | 849333 | 9/1960 |

(Continued)

OTHER PUBLICATIONS

European search report for Application No. 15195710.7-1607 dated Jun. 9, 2016.

*Primary Examiner* — David M Fenstermacher
(74) *Attorney, Agent, or Firm* — Bachman & LaPointe, PC (57) ABSTRACT

The connector system (30) includes a pivoting member (38) pivotally attached to a guide anchor (36) that is moveable secured within a guide track (34). The guide anchor (36) is movably secured between first and second strength walls (58, 62). At least one guide shoulder (70) and the pivoting member (38) define throughbores (74, 76, 78) that receive a rod (92) of a rod-and-bracket connector (88) to pivotally secure the pivoting member (38), such as a convergent flap (26) of an exhaust nozzle assembly (22). The rod-and-bracket connector (88) utilizes an L-shaped arm (96) to eliminate need for a large thread and lock nut assembly (86) between the strength walls (58, 62) to thereby facilitate use of larger, stronger guide shoulders (70, 72) between the strength walls (58, 62) to maximize strength of the connector system (30) while minimizing its volumetric displacement.

15 Claims, 8 Drawing Sheets

(56) References Cited

U.S. PATENT DOCUMENTS

| | | | |
|---|---|---|---|
| 3,879,801 A | 4/1975 | Rashid et al. | |
| 4,819,876 A * | 4/1989 | Thayer | F02K 1/006 239/265.19 |
| 5,797,544 A * | 8/1998 | Ward | F02K 1/004 239/265.37 |
| 5,813,611 A * | 9/1998 | Cires | F02K 1/004 239/265.37 |
| 6,779,336 B2 * | 8/2004 | Allore | F02K 1/06 239/127.3 |
| 7,032,835 B2 * | 4/2006 | Murphy | F02K 1/1223 239/128 |
| 7,174,704 B2 * | 2/2007 | Renggli | F02K 1/09 239/265.33 |
| 7,721,550 B2 * | 5/2010 | Peters | F02K 1/12 239/265.19 |
| 8,020,386 B2 | 9/2011 | Cowan et al. | |
| 8,733,107 B2 | 5/2014 | Swanson et al. | |
| 9,464,594 B2 * | 10/2016 | Pesyna | F02K 1/1207 |
| 2007/0039328 A1 * | 2/2007 | Petty | F02K 1/1292 60/771 |
| 2008/0072604 A1 * | 3/2008 | Swanson | F02K 1/06 60/770 |

FOREIGN PATENT DOCUMENTS

| | | |
|---|---|---|
| GB | 1119915 | 7/1968 |
| GB | 2483468 | 3/2012 |

* cited by examiner

ROD-AND-BRACKET CONNECTOR SYSTEM FOR SECURING A PIVOTING MEMBER TO A GUIDE ANCHOR MOVEABLY SECURED WITHIN A GUIDE TRACK

STATEMENT REGARDING FEDERALLY SPONSORED RESEARCH OR DEVELOPMENT

This disclosure was made with Government support under contract number FA-8650-09-D-2923-0021 (AETD) awarded by The United States Air Force. The Government has certain rights in this disclosure.

TECHNICAL FIELD

The present disclosure relates to control mechanisms for controlling motion of pivoting members secured to guide anchors that are moveably secured within guide tracks, and in particular relates to a control mechanism for controlling motion of pivoting convergent and/or divergent flaps of exhaust nozzle assemblies of gas turbine engines.

BACKGROUND ART

In the field of mechanical control systems for moving pivoting members, such as aircraft flaps, control surfaces, etc., it is common to utilize an actuator push-pull rod to move a guide anchor within a guide track, wherein the moveable guide anchor secures a structural member for pivoting movement. In order to multiply the distance moved by the pivoting member through usage of the push-pull rod of an actuator, the guide track is frequently arcuate, and also defines a linear trackway so that limited movement of the guide anchor produces much greater movement of distal ends of the pivoting member and may also produce even greater movement of additional members linked to the pivoting member. Such guide tracks utilized in aircraft must be able to withstand extraordinary mechanical stress, extremes of heat, and be virtually fail-proof. In other words, the guide anchor must be designed so that it cannot leave the guide track, and the guide track must be designed so that is cannot send or otherwise fail during exposure to extraordinary mechanical forces and thermal stresses while the guide anchor moves within the track.

Additionally, such a guide track and captured guide anchor are optimally designed to be as small as possible while capable of withstanding extraordinary operational stresses. For usage in aircraft, it is well known that minimizing weight and volume of all components is a primary design goal.

An exemplary use of a guide track and guide anchor that is moveably secured within the guide track is utilized in exhaust nozzle assemblies of gas turbine engines. It is well known that exhaust gases passing out of a gas turbine engine typically pass through an exit area or exhaust nozzle attached to an aft end of the engine. Exhaust nozzles are utilized to produce additional thrust for such a gas turbine engine by accelerating the working medium gas, for example air and a combusted fuel/air mixtures, that has passed through the low-pressure turbine and then passes through the exhaust nozzle. The exhaust nozzles vary an amount of thrust developed by the engine by varying an unimpeded area of the exhaust nozzle through which the exhaust gasses flow.

A common variable area exhaust nozzle utilizes convergent-divergent flap sets arranged circumferentially about a central longitudinal axis of the engine to form a substantially annular exhaust nozzle extending aft of the last stage of the gas turbine engine, typically being aft of a low-pressure turbine. The convergent-divergent flap sets are commonly connected to a nozzle static structure typically in the form of a sync ring that is secured to an engine casing. The flaps of each flap set are selectively moved toward and away from a central axis of the engine to vary an exhaust area between the flaps which effectively varies an unimpeded area of the exhaust nozzle through which the exhaust gasses flow. Each of the flap sets includes at least one of the convergent or divergent flaps being secured to a guide anchor. A control actuator applies a force to a sync ring surrounding the central axis of the engine, and the convergent flaps are secured to the sync ring and are also anchored to the guide anchor. As the actuator pushes or pulls the sync ring, the convergent flaps move in a manner controlled by movement of the guide anchor that is secured within a guide track. The flaps then pivot toward or away from the central axis of the engine in response to motion defined by the guide anchor, which is a form of a mechanical guide. Improvements in control apparatus for flaps defining unimpeded areas of exhaust nozzles in gas turbine engines result in substantial cost savings and enhanced performance of the engine.

It is particularly desirable to utilize mechanical guides such as a moveable guide anchor captured within, a guide track for movement of exhaust nozzle flaps that minimize size requirements for the guides and that simultaneously maximize strength and durability of the guides.

Therefore, there is a need for an improved mechanical guide that guides motion of pivoting members utilized in modern aircraft that minimizes volumetric displacement of the guide and that maximizes strength and durability of the guide.

SUMMARY OF THE DISCLOSURE

The disclosure includes a connector system for securing a pivoting member to a guide anchor moveably secured within a guide track. The guide track defines a linear trackway having a first wall or first strength wall that is secured to a first edge of the trackway. A second wall or second strength wall that is parallel to the first strength wall is secured to an opposed second edge of the trackway. The first and second strength walls ascend above a support surface of the trackway in a direction away from the support surface. The guide anchor is movably secured between the first and second strength walls and is also secured adjacent the support surface of the trackway. The guide anchor is secured against movement away from the support surface, but is secured for linear movement along the trackway, such as by rollers, slide surfaces, etc. The guide anchor includes at least one guide shoulder, and the at least one guide shoulder defines a first retention throughbore. The pivoting member also defines a pivoting member throughbore that is dimensioned to be secured adjacent the first guide shoulder so that a longitudinal axis within the throughbores extends through the first retention throughbore and the pivoting member throughbore. The longitudinal axis within the throughbores is also parallel to a width axis between the first and second strength walls. The width axis defines a shortest distance between the opposed first and second strength walls. Additionally, the longitudinal axis within the throughbores extends between the first and second strength walls, so that the throughbores are not above the strength walls. The connector system also includes a rod-and-bracket connector that is configured so that a rod of the connector passes through the first retention throughbore of the first guide shoulder and also passes through the pivoting member throughbore to secure the pivoting member to the guide anchor. The rod-and-bracket connector is also configured so that a first section of an L-shaped arm of the connector is secured to an end of the rod that extends beyond one of the first retention throughbore and the pivoting member throughbore. The first section of the L-shaped arm extends in a direction about perpendicular to a longitudinal axis of the rod and also extends a distance sufficient to extend beyond an exterior edge of the guide anchor. The L-shaped arm is also constructed so that a second section of the L-shaped arm is secured to a portion of the first section of the L-shaped arm that extends beyond the exterior edge of the guide anchor. The second section of the L-shaped arm extends in a direction parallel to the longitudinal axis of the rod and also extends adjacent the exterior edge of the guide anchor. The second section of the L-shaped arm includes a fastener that is configured to secure the rod-and-bracket connector to either the guide anchor or the pivoting member.

In an aspect of the disclosure, the distance of the width axis extending between the opposed first and second strength walls is represented as X. A shortest distance through the throughbores defined between the first and second strength walls is represented by Y, and Y is between about 60% and about 95% of the distance of X. (For purposes herein, the word "about" is to mean plus or minus 10%.)

In another embodiment, the guide anchor includes a second guide shoulder that defines a second retention throughbore. The second retention throughbore is configured to be aligned with the longitudinal axis within the first retention throughbore and the pivoting member throughbore. The first and second guide shoulders may also be configured so that the pivoting member throughbore is between the first and second retention throughbores. In this embodiment, the distance of the width axis extending between the opposed first and second strength walls is represented as X. A shortest distance through the first retention throughbore of the first guide shoulder is represented herein by Y (although not so represented in the drawings). A shortest distance through the pivoting object throughbore is represented herein by Z (although not so represented in the drawings). A shortest distance through the second retention throughbore of the second guide shoulder is represented herein by W (although not so represented in the drawings). A sum of the distances Y plus Z plus W is between about 60% and about 95% of the distance of X.

In another aspect of the disclosure, the first and second guide shoulders are configured so that the pivoting member throughbore is between the first and second retention throughbores of the first and second guide shoulders.

In a further aspect of the connector system, a receiving bore is defined within either the guide anchor or the pivoting member. The fastener includes a securing wide-head bolt that is configured to be selectively secured to and removed from the receiving bore. A bolt throughbore is defined within the second section of the L-shaped arm. The wide-head bolt has a stem and a bolt head, and the bolt is configured so that the stem passes through the bolt throughbore to be selectively secured to and removed from the receiving bore. The bolt head is configured to be wider than the bolt throughbore to secure the second section of the L-shaped arm adjacent the receiving bore.

In another embodiment of the connector system, the second section of the L-shaped arm defines a through slot extending from the bolt throughbore to and through a perimeter edge of the second section, so that the through slot defines a longitudinal axis parallel to the longitudinal axis of the rod. Therefore, the through slot in the second section of the L-shaped arm may slide around a stem of a securing wide-head bolt secured to one of the guide anchor and the pivoting member. Additionally, at least one lock extension adjacent the through slot extends away from the outer surface of the second section of the L-shaped arm in a direction away from the guide anchor. The lock extension is configured to abut the bolt head secured to the securing bolt, so that the lock extension prevents movement of the rod and L-bracket connector in a direction parallel to the longitudinal axis of the rod whenever the bolt head moves to loosen a connection between the second section of the L-shaped arm and one of the guide anchor and the pivoting member.

In another aspect of the disclosure, the guide track is in the form of a slider track secured to a nozzle static structure of an exhaust nozzle assembly of a gas turbine engine. The guide anchor is in the form of a slider secured within the slider track, and the slider track is configured for permitting sliding motion of the slider within the slider track. Further, the guide anchor defines a first slider shoulder defining a first retention throughbore and a second slider shoulder defining a second, retention throughbore. The pivoting member is in the form of a flap of the exhaust nozzle assembly, and the flap defines a flap throughbore aligned with the first and second retention throughbores so that the flap is pivotally secured to the slider. In this embodiment, the slider track defines a slide-way extending between a first lock-slot and a second lock-slot, and the first and second lock-slots are defined at opposed first and second edges of the slide-way. Additionally, the slider is secured within each slider track adjacent the slide-way by opposed first and second lock wedges of the slider that extend into the first and second lock-slots of the slider track.

Also in the slider track and slider embodiment of the present connector system, a distance of the width axis extending a shortest distance between the opposed first and second strength walls is represented as X. A shortest distance through the first retention throughbore is represented herein by Y (although not so represented in the drawings). A shortest distance through the flap retention throughbore is represented herein by Z (although not so represented in the drawings). A shortest distance through the second retention throughbore is represented herein by W (although not so represented in the drawings). In this embodiment, a sum of the distances Y plus Z plus W is between about 60% and about 95% of the distance of X.

In another aspect, the disclosure includes the pivoting member being a load member secured to an anchor by the rod-and-bracket connector system. In this aspect the rod is configured to pass through a retention throughbore defined within a guide shoulder of the anchor and to also pass through a load member throughbore to secure the load member to the shoulder of the anchor. An L-shaped arm is secured to the rod so that a first section of the L-shaped arm of the connector is secured to an end of the rod that extends beyond one of the retention throughbore of the guide shoulder and the load member throughbore. Additionally, first section of the L-shaped arm extends in a direction about perpendicular a longitudinal axis of the rod and also extends a distance sufficient to extend beyond an exterior edge of the anchor. The L-shaped arm also is configured so that a second section of the L-shaped arm is secured to a portion of the first section of the L-shaped arm that extends beyond the exterior edge of the anchor, and the second section of the L-shaped arm extends in a direction parallel to the longitudinal axis of the rod and also extends adjacent the exterior edge of the anchor. The second section of the L-shaped arm includes a fastener configured to secure the rod-and-bracket connector to one of the anchor and the load member so that the fastener prohibits the rod from moving out of the guide shoulder throughbore and the load member throughbore.

Additionally, the anchor may include a first wall and an opposed second wall having a width axis that extends between the first and second walls a shortest distance between the opposed walls. A longitudinal axis within the retention throughbore of the shoulder and the load member throughbore extends in a direction parallel to the width axis and extends between the opposed first and second walls. In this embodiment, a distance of the width axis extending a shortest distance between the opposed first and second walls is represented as X, a shortest distance through the throughbores defined between the first and second walls is represented by Y, and Y is between about 60% and about 95% of the distance of X.

In this aspect, the load member may a pivoting member, the throughbores may define cylindrical throughbores, and the rod may be formed to be cylindrical to thereby facilitate pivoting movement of the load member relative to the anchor.

Also in this aspect, the fastener of the rod-and-bracket connector may include a receiving bore defined within one of the anchor and the load member. The fastener may also include a securing bolt configured to be selectively secured to and removed from the receiving bore, and a bolt throughbore is defined within the second section of the l-shaped arm. A bolt has a stem and a bolt head, and the bolt head is configured so that the stem passes through the bolt throughbore to be selectively secured to and removed from the receiving bore. Additionally, the bolt head is configured to be wider than the bolt throughbore in order to secure the second section of the L-shaped arm adjacent the receiving bore.

In this embodiment, the second section of the L-shaped arm may define a through slot that extends from the bolt throughbore of the fastener to and through a perimeter edge of the second section. The through slot defines a longitudinal axis parallel to the longitudinal axis of the rod. Therefore, the securing bolt secured to one of the anchor and the load member into may slide into the through slot within the second section of the L-shaped arm. At least one lock extension adjacent the through slot extends away from the surface of the second section of the L-shaped arm in a direction away from the anchor. The lock extension is configured to abut the bolt bead secured to the securing bolt, so that the lock extension prevents movement of rod-and-bracket connector in a direction parallel to the longitudinal axis of the rod whenever the bolt head moves to loosen a connection between the second section of the L-shaped arm and one of the guide and the load member.

By using the rod-and-bracket connector system to secure the pivoting member, such as the flap, to the guide anchor, such as the slider, the present rod-and-bracket connector assembly eliminates any need for traditional threaded bolt extensions passing out of the retention and/or pivoting member throughbores, to be secured within the throughbores and between the confining strength walls by traditional threaded nuts, washers and other complex, large bolt and lock-nut apparatus. This enables the guide shoulders to be thicker, and hence stronger and more durable within the same space between the strength walls of the guide anchor. Or, the guide shoulders may remain the same size, while the distance between the strength walls is reduced, thereby reducing the size and weight of the guide track, without reducing the size or strength of the guide shoulders. Alternatively, the guide track could be made somewhat smaller, while the guide shoulders are made somewhat larger, to thereby reduce the size of the guide track while simultaneously increasing the strength and durability of the guide anchor to produce a connector assembly having optimal characteristics for specific design requirements.

Accordingly, it is a general object of the present disclosure to provide a rod-and-bracket connector system for securing a pivoting member to a guide anchor moveably secured within a guide track that overcomes deficiencies of the prior art.

It is a more specific object of the present disclosure to provide a rod-and-bracket connector system for securing a pivoting member to a guide anchor moveably secured within a guide track that provides for optionally minimizing a size of components of the connector assembly, maximizing strength and durability of the components of the assembly, or altering the size, strength and durability of the system components to produce a predetermined size, strength and durability that is optimal for a specific use, such as within an exhaust nozzle assembly.

These and other objects and values of the present disclosure will become apparent in the following detailed description and the accompanying drawings.

DESCRIPTION OF THE PREFERRED EMBODIMENTS

Figure 1:
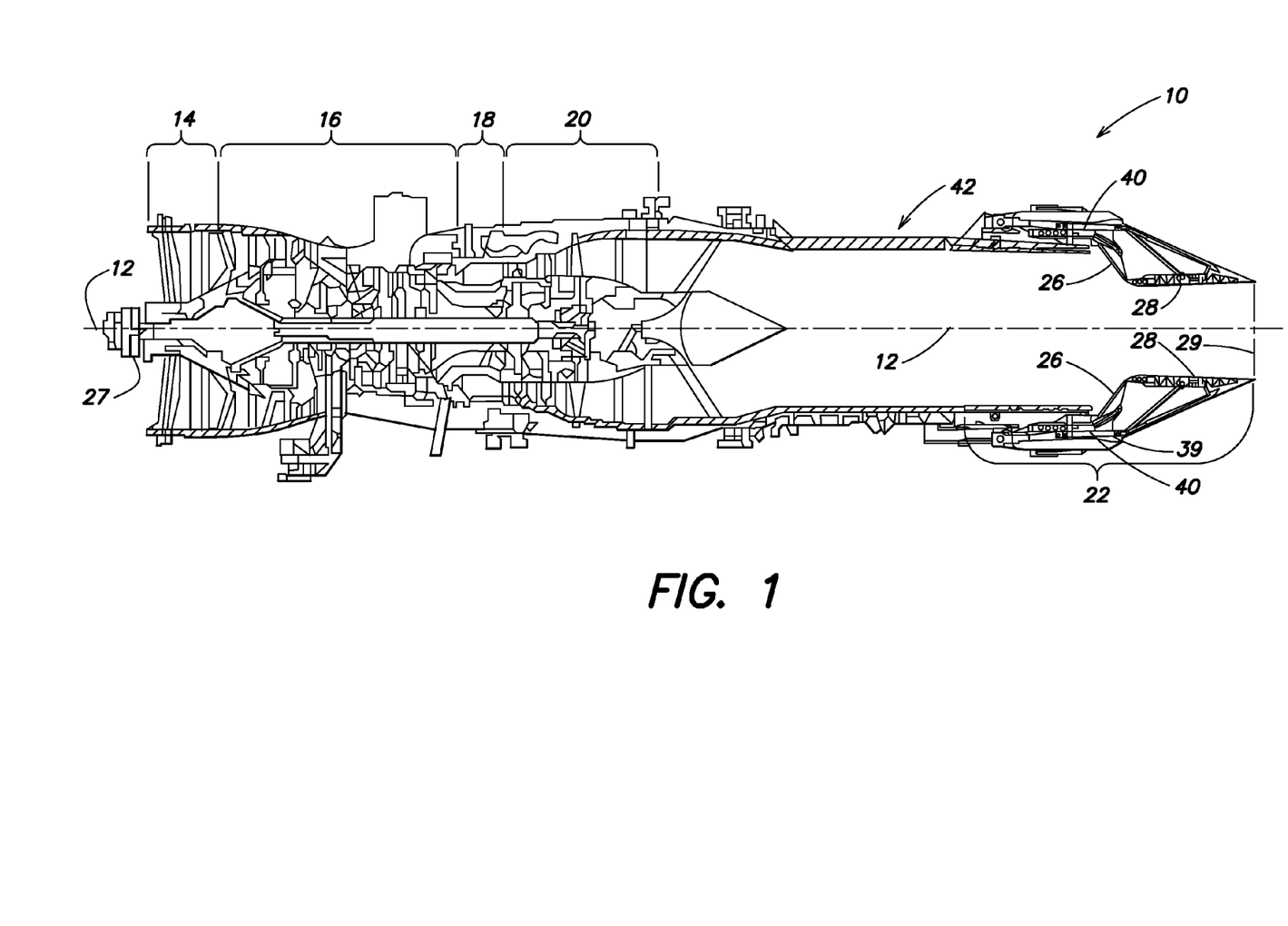
FIG. 1 is an axial cross-section view of a gas turbine engine showing an exhaust nozzle assembly being a working environment of the present invention.

Referring to the drawings in detail, FIG. 1 is an axial cross-section of a gas turbine engine 10 including an engine central axis 12, a fan section 14, a compressor section 16, a combustion section 18, a turbine section 20, and exhaust nozzle assembly 22. (It is noted that the FIG. 1 gas turbine engine 10 components are not drawn to scale, and are only a simplified view for orientation of the important aspects of the disclosure discussed below with reference to FIGS. 2-8.) The exhaust nozzle assembly 22 includes a plurality of convergent flaps 26 and divergent flaps 28. During operation of the gas turbine engine 10, a working medium gas stream 27, such as atmospheric air, is pulled into the engine 10 by the fan 12 section, then compressed in the compression section 16, then mixed with fuel and combusted in the combustion section 18, which combustion expands the fuel air mixture to increase the pressure of the mixture that then passes through turbine section 20 rotating turbines therein which in turn rotate compressor blades in the compression section 16, in a manner well known in the art. The combusted fuel air mixture then exits the engine through an unimpeded area 29 of the exhaust nozzle assembly 22. Control of the convergent flaps 26 and divergent flaps 28 changes the dimensions of the unimpeded area 29 to thereby effect thrust of the engine 10.

Figure 2:
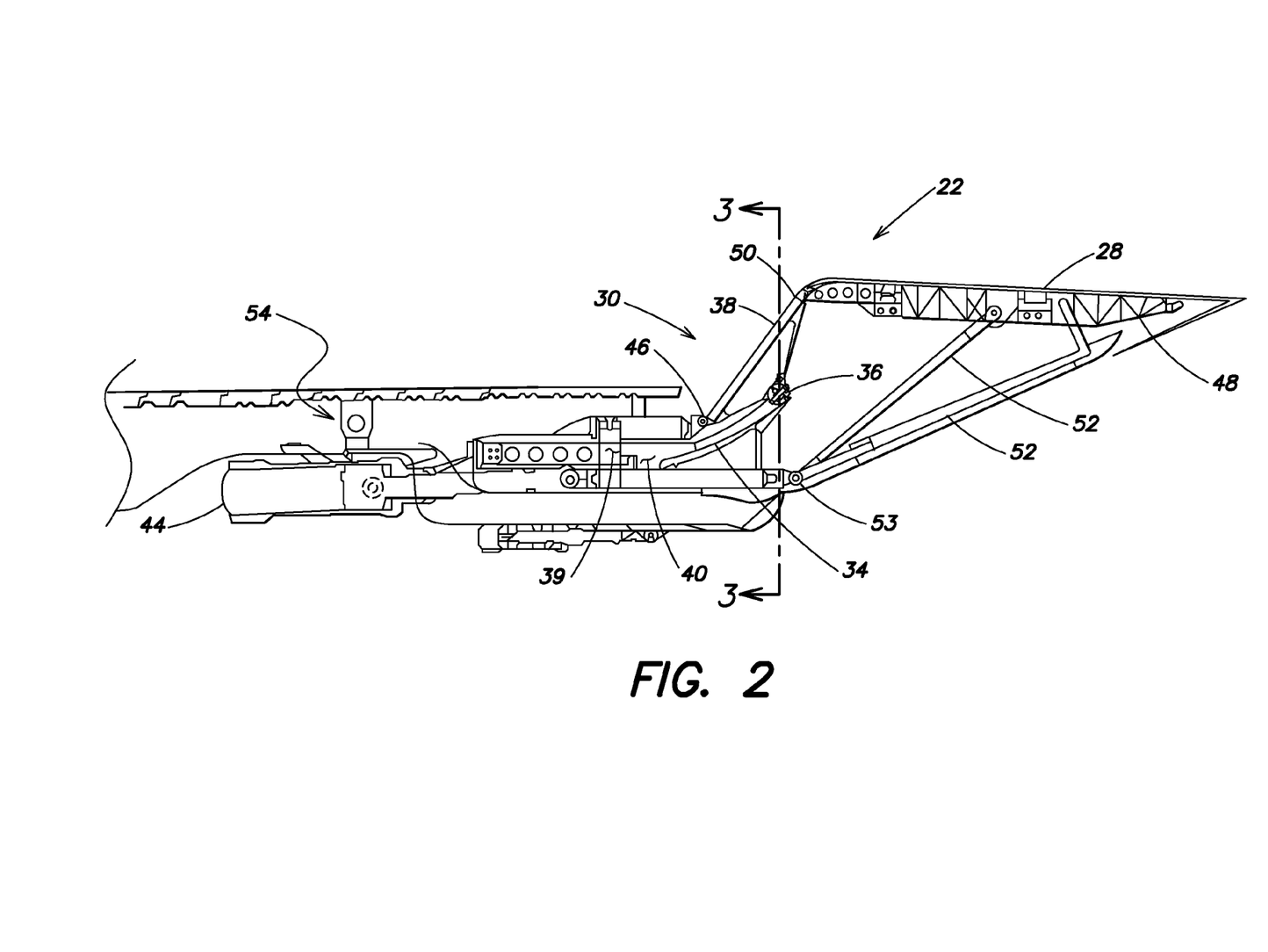
FIG. 2 is a side view of a connector system constructed in accordance with the present invention and utilized within the exhaust nozzle assembly of FIG. 1.

FIG. 2 is an expanded side view of a connector system 30 of the present disclosure that may be utilized within the exhaust nozzle assembly 22 of FIG. 1. The connector system 30 shown in FIG. 2 includes a guide track 34 that houses an anchor or guide anchor 36 within the track 34. A pivoting member 38, such as a convergent flap 26, is pivotally secured to the guide anchor 36. The guide track 34 is secured to a nozzle static structure 40 that may take the form of an annular ring surrounding the aft portion 42 of the engine 10 and co-axial with the central axis 12 of the engine 10.

An actuator 44 controls motion of the pivoting member 38, such as by way of a sync ring 39 that surrounds the central axis 12 of the engine 10. The pivoting member 38 may be a convergent flap 26 that is secured to the sync ring 39 and that is also anchored to the guide anchor 36. As the actuator 44 pushes or pulls the sync ring 39, the convergent flap 26 moves in a manner controlled by movement of the guide anchor 36 that is secured within the guide track 34.

As shown in FIG. 2, the pivoting member 38 pivots upward about pivot connection 46 along the guide track 34 as the actuator 44 moves the sync ring 39 and pivoting member 38 from the left to the right in FIG. 2. FIG. 2 also shows a guide track 34 and guide anchor 36 utilized within the connector system 30 of the gas turbine engine 10 exhaust nozzle assembly 22. Also shown in FIG. 2 is another pivoting member 48, namely a divergent flap 48 pivotally connected to a distal end 50 of the first pivoting member 33 or convergent flap 26. A linkage strut assembly 52 connects the divergent flap 48 with a pivot mount 53 secured to the sync ring 39 that is operated by the actuator 44 so that the divergent flap 48 moves in response to movement of the convergent flap 26. FIG. 2 also shows a support assembly 54 means for securing the exhaust nozzle assembly to the aft-portion 42 of the gas turbine engine 10.

Figure 3:
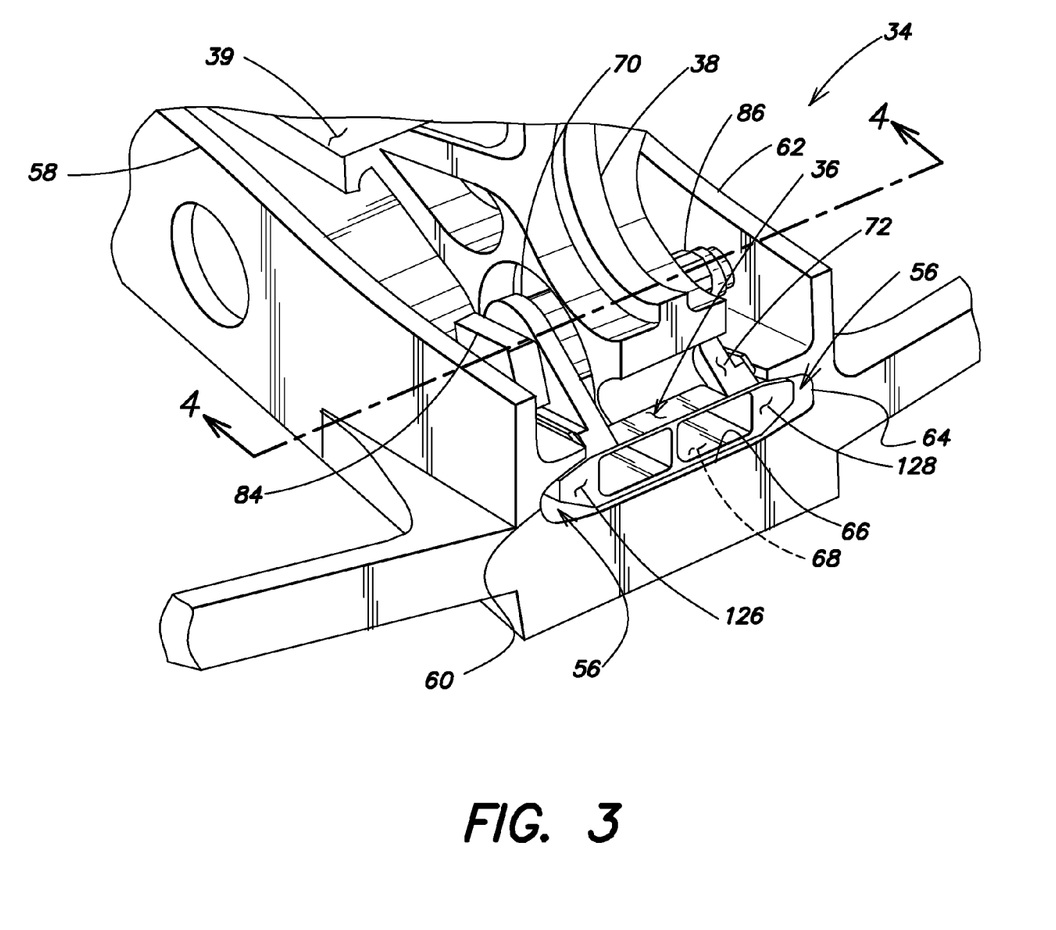
FIG. 3 is a sectional view of a mechanical guide of an exhaust nozzle assembly showing a bolt and threaded nut assembly securing a flap to and between shoulders of the mechanical guide assembly shown along view line 3-3 of FIG. 2.

FIG. 3 shows a sectional view of the guide track 34 of the connector system 30 of the exhaust nozzle assembly 22 taken along view line 3-3 of FIG. 2. The guide track 34 defines a linear trackway 56 having a first strength wall 58 that is secured to a first edge 60 of the trackway 56. A second strength wall 62 that is parallel to the first strength wall 58 is secured to an opposed second edge 64 of the trackway 56. The first and second strength walls 58, 62 ascend above a support surface 66 of the trackway 56 in a direction away from the support surface 66. The guide anchor 36 or mechanical guide 36 is movably secured between the first and second strength walls 58, 62 and is also secured adjacent the support surface 66 of the trackway 56. The guide anchor 36 is secured against movement away from the support surface 66, but is secured for linear movement along the trackway 56, such as by rollers (not shown), or a slide surface 68, etc. The guide anchor 36 includes at least one guide shoulder 70. FIG. 3 shows a second guide shoulder 72.

Figure 4:
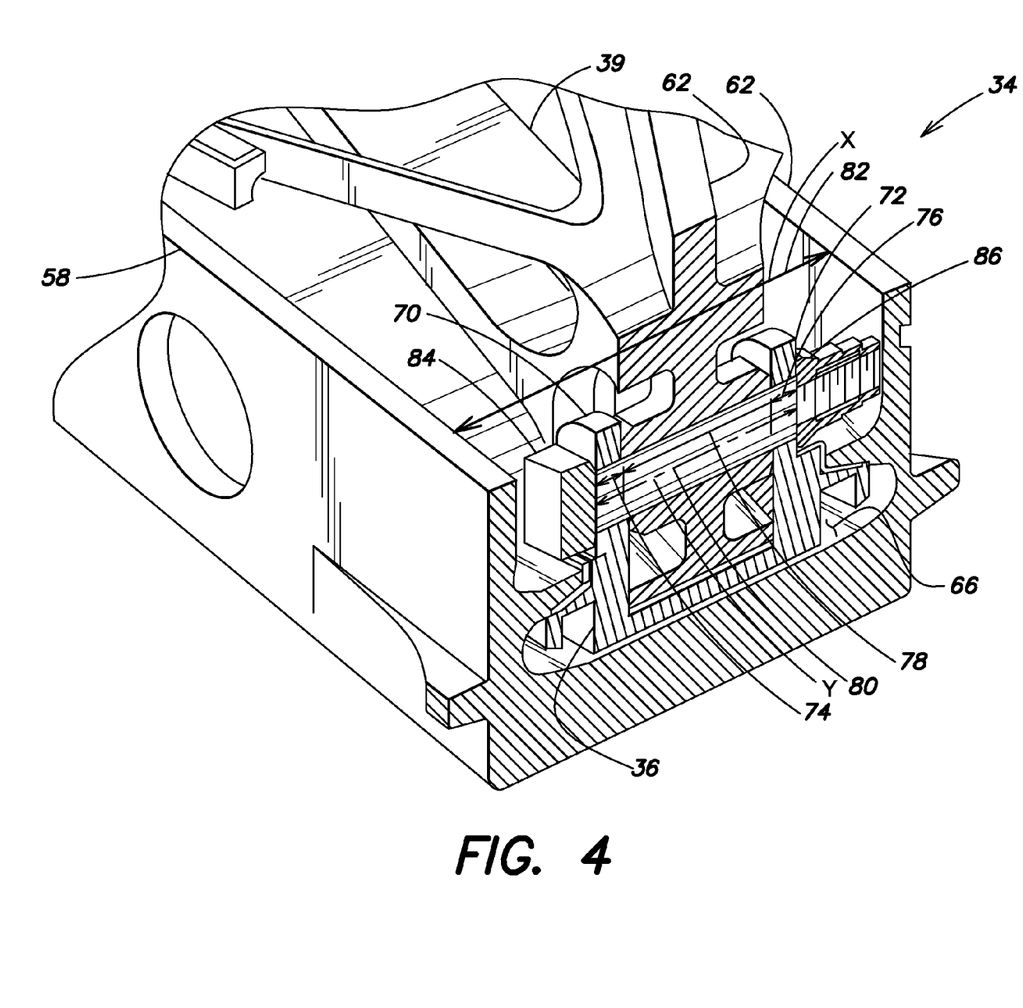
FIG. 4 is a cross-section view of the bolt and threaded nut assembly of FIG. 3 shown along view line 4-4 of FIG. 3.

FIG. 4, which is a cross-section of FIG. 3, taken along sight-lines 4-4 of FIG. 3, shows that the first guide shoulder 70 defines a first retention throughbore 74, and that the second guide shoulder 72 defines a second retention throughbore 76. The pivoting member 38 also defines a pivoting member throughbore 78 that is dimensioned to be secured adjacent the first guide shoulder 70 so that a longitudinal axis 80 within the throughbores 74, 76, 78 extends through the first retention throughbore 74, the pivoting member throughbore 78 and the second retention throughbore 76. The longitudinal axis 80 within the throughbores 74, 76, 78 is also parallel to a width axis 82 between the first and second strength walls 58, 62. The width axis 82 defines a shortest distance between the opposed first and second strength walls 58, 62. Additionally, the longitudinal axis 80 within the throughbores 74, 76, 78 extends between the first and second strength walls 58, 62, so that the throughbores 74, 76, 78 are not above the strength walls 58, 62, but are between and confined by the strength walls 58, 62. FIGS. 3 and 4 show the pivoting member 38 or convergent flap 26 secured to the guide anchor 36 by a traditional wide-head bolt 84 with a threaded nut assembly 80 passing through the throughbores 74, 76 and 78.

Figure 5:
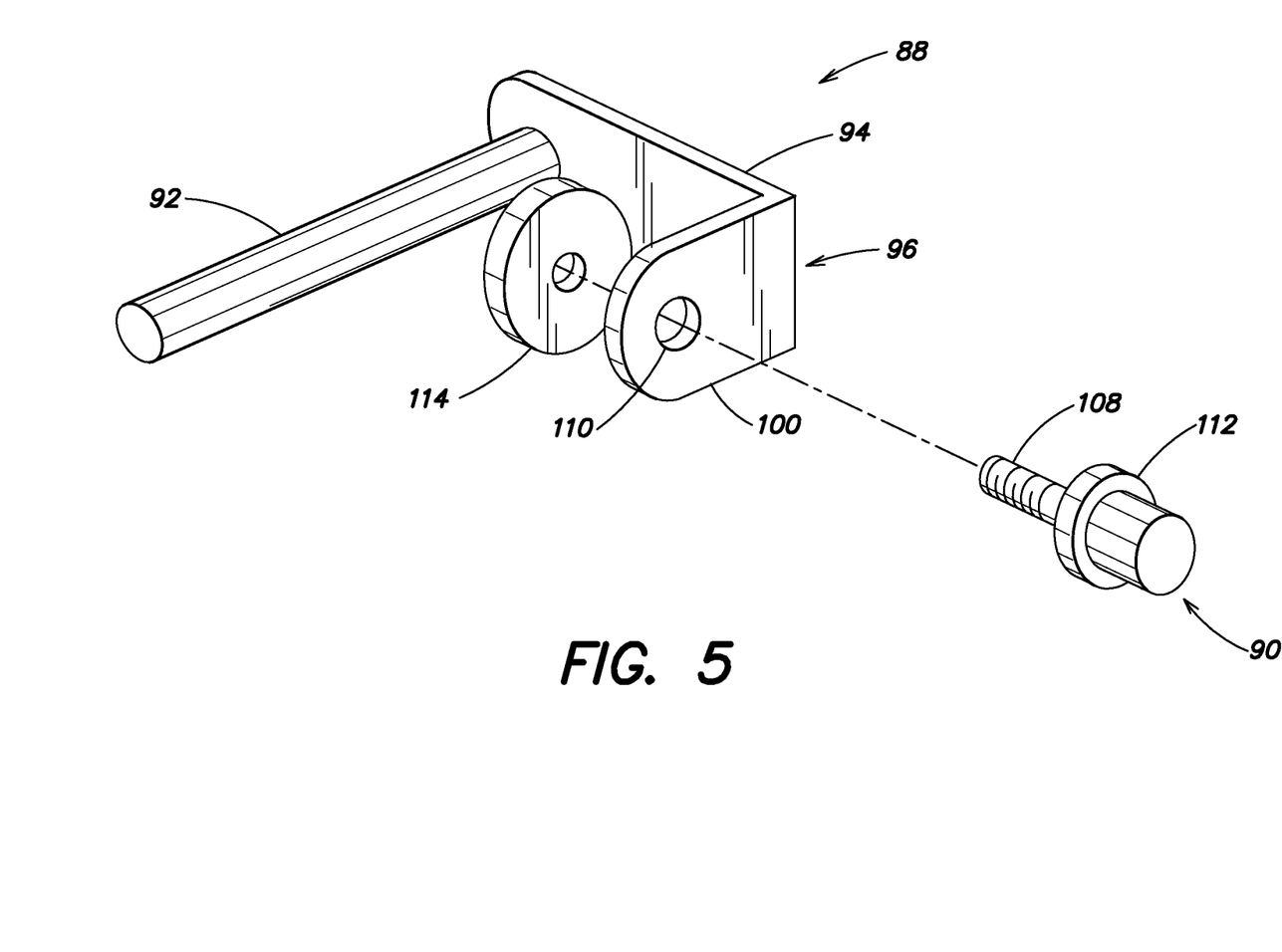
FIG. 5 is a perspective view of a rod-and-bracket connector of the present disclosure, and showing a securing bolt displaced from the connector.

FIG. 5 shows a perspective view of a rod-and-bracket connector 88 of the present disclosure that is used to replace the wide-head bolt 84 and threaded nut assembly 86 shown in FIGS. 3 and 4. FIG. 5 shows a second securing wide-head bolt 90 displaced away from the connector 88. The rod-and-bracket connector 88 includes a rod 92 of the connector 88 that is dimensioned to pass through the first throughbore 74 of the first guide shoulder 70, to pass through the pivoting member throughbore 78, and to pass through the pivoting second retention throughbore 76 of the second guide shoulder 72. The rod 92 therefore secures member 38 to the guide anchor 36.

The rod-and-bracket connector 88 is also configured so that a first section 94 of an L-shaped arm 96 of the connector 88 is secured to an end of the rod 92 that extends beyond one of the first retention throughbore 74, the pivoting member throughbore 78 (if the guide anchor 36 includes only one guide shoulder 70), or the second retention throughbore 76 of the second guide shoulder 72. As best shown in FIG. 5, the first section 94 of the L-shaped arm 96 extends in a direction about perpendicular a longitudinal axis of the rod 92 and also extends a distance sufficient to extend beyond an exterior edge 98 (shown in FIG. 6) of the guide anchor 36'. The L-shaped arm 96 is also constructed so that a second section 100 of the L-shaped arm 96 is secured to a portion 102 (shown in FIG. 6) of the first section 94 of the L-shaped arm 96 that extends beyond the exterior edge 98 of the guide anchor 36'. (In FIGS. 6 and 7, components that are virtually identical to components described with respect to FIGS. 3 and 4, are show with reference numerals having primes of the same reference numerals in FIGS. 3 and 4. For example the guide anchor 36 of FIGS. 3 and 4 is designated 36' in FIGS. 6 and 7.) The second section 100 of the L-shaped arm 96 extends in a direction parallel to the longitudinal axis of the rod 92 and also extends adjacent the exterior edge 98 of the guide anchor 36'.

The second section 100 of the L-shaped arm 96 includes a fastener 104 means for securing the second section 100 of the L-shaped arm 96 to either the guide anchor 36' or the pivoting member 38'. The fastener means 104 may include a wide-head securing bolt 90 and receiving bore 106 as described below, or a standard mechanical screw, a weld, a bond, a tongue-and-groove fastening arrangement, an ancillary spring clip (none of which are shown in the drawings) for securing the second section 100 to the guide anchor 36', or pivoting member 38', or any other apparatus known in the art for performing the straight-forward function described for the fastener means 104. FIG. 5 also shows that a particular fastener means 104 includes the second wide-head bolt 90, having a stem 108 dimensioned to pass through a bolt throughbore 110 defined within the second section 100 of the L-shaped arm 96, and having a holt head 112 being configured to be wider than the bolt throughbore 110 of the second section 100 of arm 96. The stem 108 is configured to be selectively secured within and removed from the receiving bore 106. FIG. 5 also shows that a securing washer 114 may also be utilized with the fastener means 104, if necessary.

FIGS. 3, 4, 6 and 7 show that the guide track 34, 34' is in the form of a slider track 34' secured to a nozzle static structure 40 of an exhaust nozzle assembly 22 (shown in FIG. 2) of a gas turbine engine 10. The guide anchor 36, 36' is in the form of a slider 36, 36' secured within the slider track 34, 34', and the slider track 34, 34' is configured for permitting sliding motion of the slider 36, 36' within the slider track 34, 34'. FIGS. 3, 4, 6 and 7 also show the guide anchor 36, 36' secured above the support surface 66, 66' of a slide-way 116 (identified only in FIGS. 6 and 7 for numbering efficiency) extending between a first lock-slot 118 and a second lock-slot 120. The first lock-slot 118 is defined at a first edge 122 of the slide way 116, and the second lock slot 120 is defined at a second edge 124 of the slide-way 116. The slider 36' is secured within the slider track 34' adjacent the slide-way 116 by a first lock wedge 126 extending into the first lock-slot 118 and by an opposed second lock wedge 128 extending into the second lock-slot 120 of the slider 36, 36'.

Figure 7:
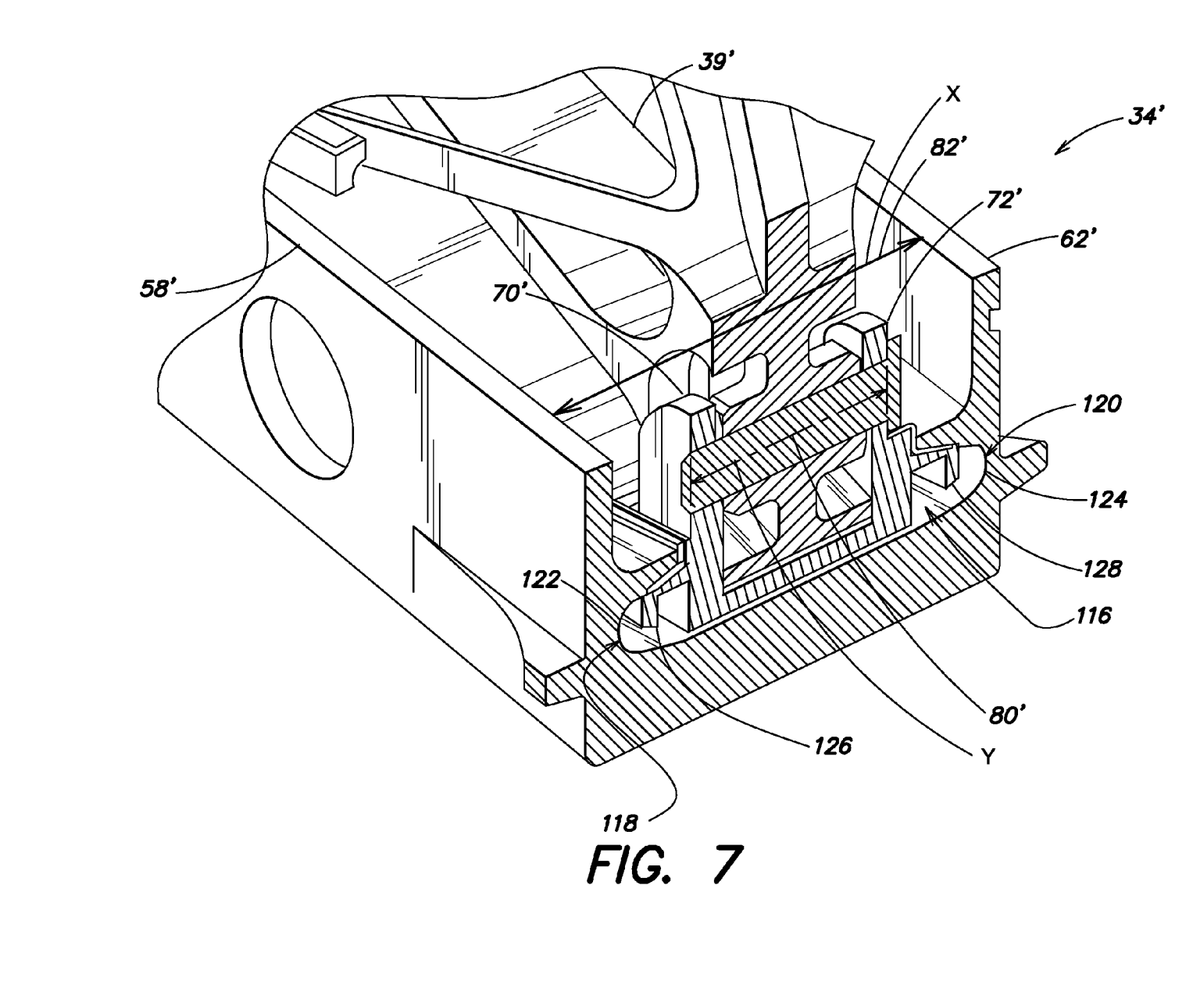
FIG. 7 is a cross-section view of a rod of the FIG. 6 rod-and-bracket connector passing through first and second shoulder retention throughbores of the mechanical guide and passing through a flap throughbore of the flap shown along view line 7-7 of FIG. 6.

In the FIGS. 4 and 7 embodiment described above of the present connector system, a distance of the width axis 82, 82' extending a shortest distance between the opposed first and second strength walls 58, 58', 62, 62' is represented as X, as also designated in FIGS. 4 and 7 by the letter "X" and a lead line. Additionally, a shortest distance through all of the throughbores defined between the first and second strength walls (including but not limited to throughbores 74, 76, 78) is herein represented by Z (although not shown in the drawings), and Z is between about 60% and about 95% of the distance of X. (For purposes herein, the word "about" is to mean plus or minus 10%.)

Figure 6:
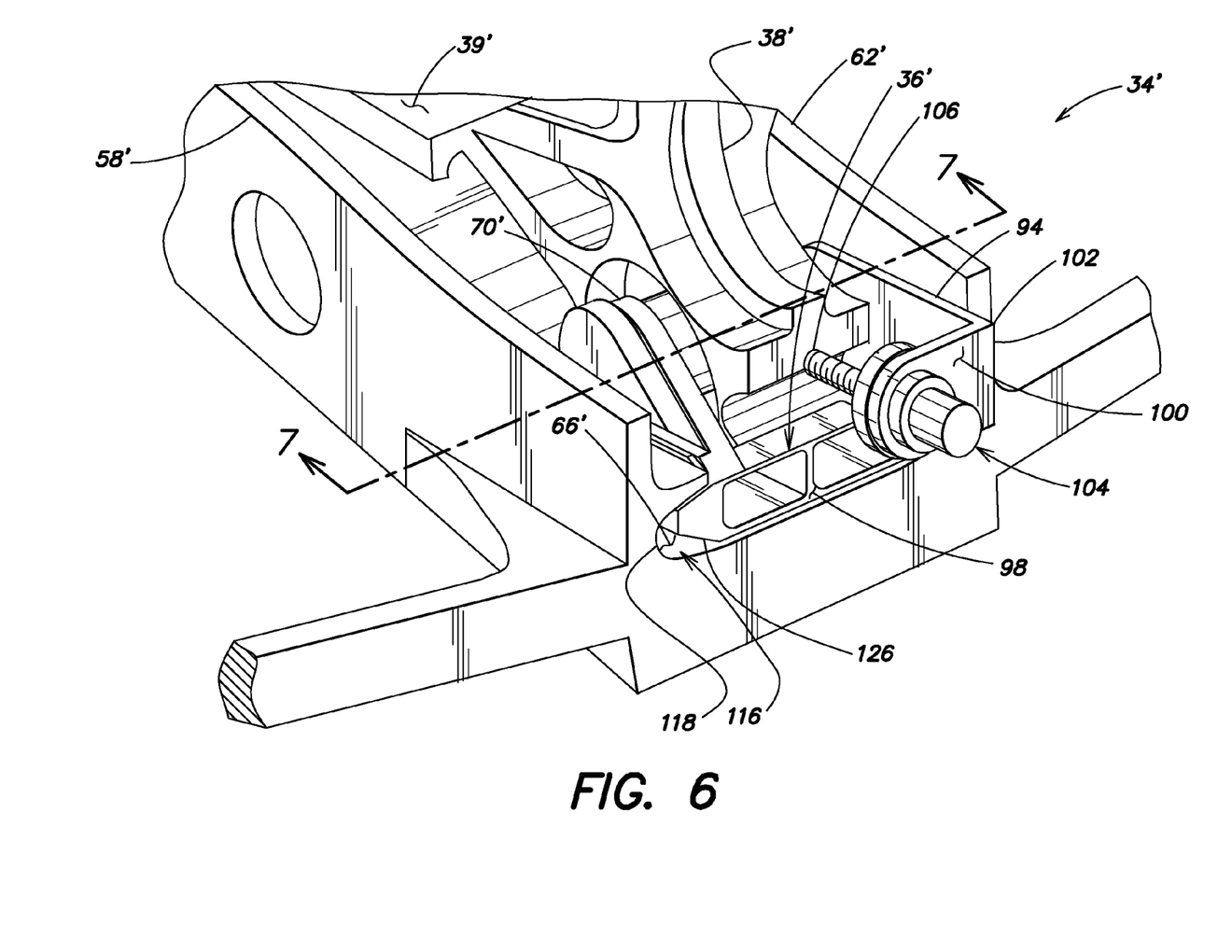
FIG. 6 is a sectional view of a mechanical guide of an exhaust nozzle assembly showing a rod-and-bracket connector securing a flap between shoulders of the mechanical guide.

Also in the FIGS. 6 and 7 embodiment described above of the present connector system, a distance of the width axis 82, 82' extending a shortest distance between the opposed first and second strength walls 58, 58', 62, 62' is represented as X. A shortest distance through the first retention throughbore 74 is represented herein by Y (although not so represented in the drawings), as also designated in FIGS. 4 and 7 by the letter "Y" and a lead line. A shortest distance through the flap retention throughbore 78 is represented herein by Z (although not so represented in the drawings). A shortest distance through the second retention throughbore 76 is represented herein by W (although not so represented in the drawings). In this embodiment, a sum of the distances Y plus Z plus W is between about 60% and about 95% of the distance of X.

Figure 8:
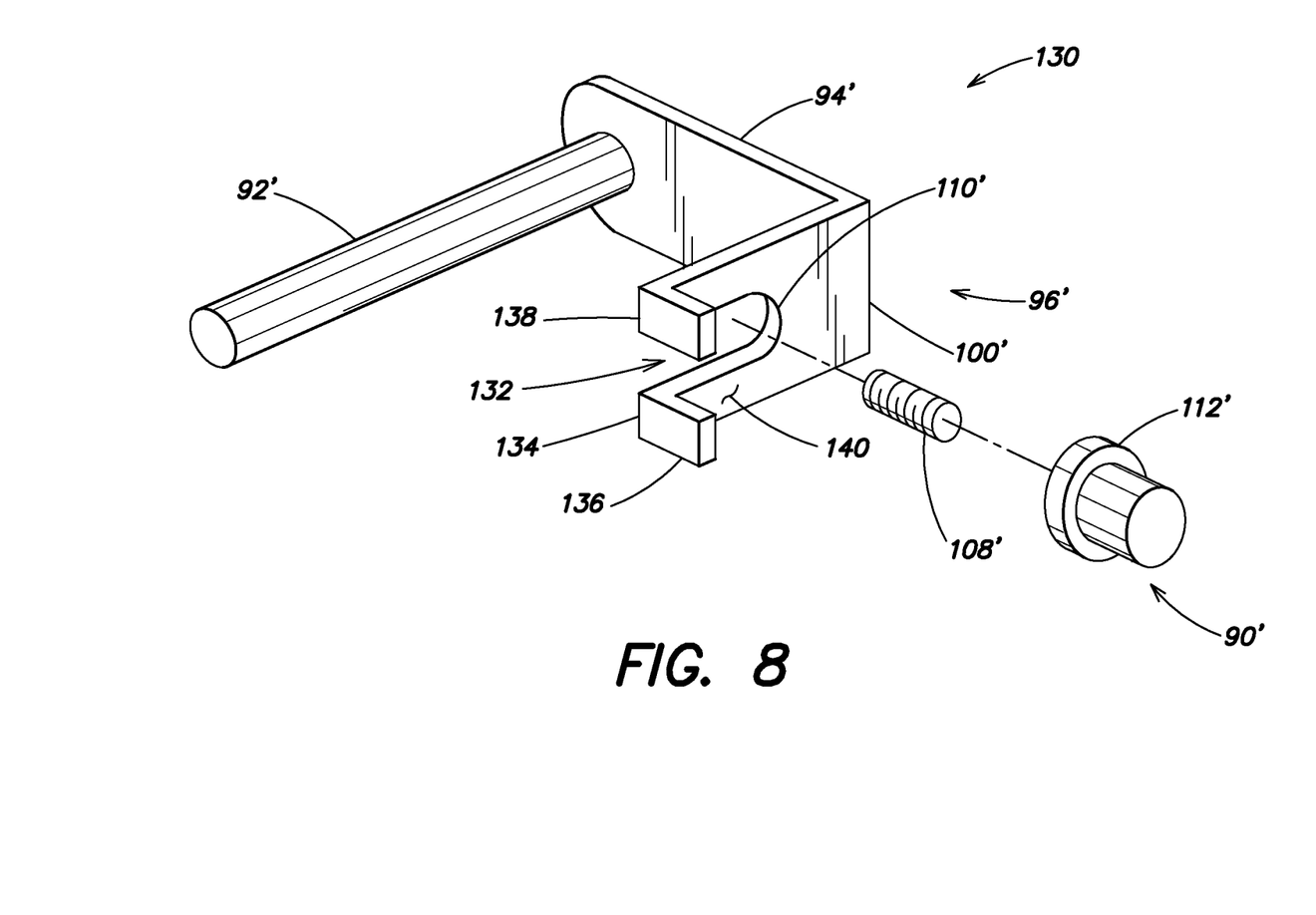
FIG. 8 is a perspective view of an alternative embodiment of the rod-and-bracket connector showing lock extensions on a second section of an L-shaped arm of the connector and showing a bolt head displaced from the connector.

FIG. 8 shows an alternative rod-and-bracket connector 130. (Components of the alternative rod-and-bracket connector 130 that are virtually identical to the FIG. 5 rod-and-bracket connector 88 are shown as primes of the reference numerals shown in FIG. 5. For example, the rod 92 of the connector 88 of FIG. 5 is shown as 92' in FIG. 8.) In the alternative connector 130, the second section 100' of the L-shaped arm 96' defines a through slot 132 extending from the bolt throughbore 110' to and through a perimeter edge 134 of the second section 100' of the L-shaped arm 96', so that the through slot 132 defines a longitudinal axis parallel to the longitudinal axis of the rod 92'. Therefore, the through slot 132 in the second section 100' of the L-shaped arm 96' may slide around a stem 108' of a securing wide-head bolt 90' secured to one of the guide anchor 36, 36' and the pivoting member 38, 38'. The second section 100' of the arm 96' includes at least one lock extension 136. (FIG. 8 shows an optional second lock extension 138.) The lock extension 136 is adjacent the through slot 132 and extends away from an outer surface 140 of the second section 100' of the L-shaped arm 96' in a direction away from the guide anchor 36'. The lock extension 136 is configured to abut the bolt head 112' secured to the securing bolt 90', so that the lock extension 136 prevents movement of the rod 92' and alternative rod-and-bracket connector 130 in a direction parallel to the longitudinal axis of the rod 92' if the bolt head 112' moves to loosen a connection between the second section 100' of the L-shaped arm 96' and one of the guide anchor 36' and the pivoting member 38'.

All patents, published patent applications and related patent documents referred to herein are incorporated herein by reference thereto.

While the above disclosure has been presented with respect to the described and illustrated embodiments of the rod-and-bracket connector for securing a flap to a slider within an exhaust nozzle assembly of a gas turbine engine, it is to be understood that the disclosure is not to be limited to those alternatives and described embodiments. Accordingly, reference should be made primarily to the following claims rather than the foregoing description to determine the scope of the disclosure.

What is claimed is:

1. A connector system for securing a pivoting member to a guide anchor moveable secured within a guide track, the connector system comprising:
   a. the guide track defining a linear trackway, a first strength wall at a first edge of the trackway, a second strength wall parallel to the first strength wall at an opposed second edge of the trackway, the first and second strength walls ascending above a support surface of the trackway in a direction away from the support surface;
   b. the guide anchor being movably secured between the first and second strength walls and adjacent the support surface of the trackway, the guide anchor being secured against movement away from the support surface and being secured for linear movement along the trackway, the guide anchor including at least a first guide shoulder, the first guide shoulder defining a first retention throughbore and the pivoting member defining a pivoting member throughbore dimensioned to be secured adjacent the first guide shoulder so that a longitudinal axis within the throughbores extends through the first retention throughbore and the pivoting member throughbore, and wherein the longitudinal axis within the throughbores is parallel to a width axis extending a shortest distance between the opposed first and second strength walls, and wherein the longitudinal axis within the throughbores extends between the first and second strength walls; and, c. a rod-and-bracket connector configured so that a rod of the connector passes through the first retention throughbore of the at least first guide shoulder and through the pivoting member throughbore to secure the pivoting member to the guide anchor; the rod-and-bracket connector also being configured so that a first section of an L-shaped arm of the connector is secured to an end of the rod that extends beyond one of the first retention throughbore and the pivoting member throughbore, and the first section of the L-shaped arm extends in a direction about perpendicular to a longitudinal axis of the rod and also extends a distance sufficient to extend beyond ah exterior edge of the guide anchor, the L-shaped arm also being configured so than a second section or the L-shaped arm is secured to a portion of the first section of the L-shaped arm that extends beyond the exterior edge of the guide anchor, the second section of the L-shaped arm extends in a direction parallel to the longitudinal axis of the rod and also extends adjacent the exterior edge of the guide anchor, and wherein the second section of the L-shaped arm includes a fastener configured to secure the rod-and-bracket connector to one of the guide anchor and the pivoting member.

2. The connector system of claim 1, wherein a distance of the width axis extending a shortest distance between the opposed first and second strength walls is represented as X, a shortest distance through the throughbores defined between the first and second strength walls is represented by Y, and Y is between about 60% and about 95% of the distance of X.

3. The connector system of claim 1, further comprising the guide anchor including a second guide shoulder defining a second retention throughbore configured to be aligned with the longitudinal axis within the first retention throughbore and within the pivoting member throughbore, wherein the distance of the width axis extending a shortest distance between the opposed first and second strength walls is represented as X, a shortest distance through the first retention throughbore of the first guide shoulder is represented herein by Y, a shortest distance through the pivoting object throughbore is represented herein by Z, a shortest distance through the second retention throughbore of the second guide shoulder is represented herein by W, and a sum of the distances of Y plus Z plus W is between about 60% and about 95% of the distance of X.

4. The connector system of claim 3, wherein the first and second guide shoulders are configured so that the pivoting member throughbore is between the first and second retention throughbores of the first and second guide shoulders.

5. The connector system of claim 1, wherein the fastener of the rod-and-bracket connector further comprises a receiving bore defined within one of the guide anchor and the pivoting member, the fastener including a securing bolt configured to be selectively secured to and removed from the receiving bore, a bolt throughbore defined within the second section of the L-shaped arm, the securing bolt having a stem and bolt head, the securing bolt being configured so that the stem passes through the bolt throughbore to be selectively secured to and removed from the receiving bore, and the bolt head being configured to be wider than the bolt throughbore to secure the second section of the L-shaped arm adjacent the receiving bore.

6. The connector system of claim 5, wherein the second section of the L-shaped arm defines a through slot extending from the bolt throughbore to and through a perimeter edge of the second section, so that the through slot defines a longitudinal axis parallel to the longitudinal axis of the rod so that so that the securing bolt secured to one of the guide anchor and the pivoting member may slide into the through slot within the second section of the L-shaped arm, and wherein at least one lock extension adjacent the through slot extends away from the surface of the second section of the L-shaped arm in a direction away from the guide anchor, and wherein the lock extension is configured to abut the bolt head secured to the securing bolt, so that the lock extension prevents movement of the rod and L-bracket connector in a direction parallel to the longitudinal axis of the rod whenever the bolt head moves to loosen a connection between the second section of the L-shaped arm and one of the guide anchor and the pivoting member.

7. The connector system of claim 1, further comprising:
a. wherein the guide track comprises a slider track secured to a nozzle static structure of an exhaust nozzle assembly of a gas turbine engine, wherein the guide anchor comprises a slider secured within the slider track, wherein the slider track is configured for permitting sliding motion of the slider within the slider track, wherein the guide anchor defines a first slider shoulder defining a first retention throughbore and a second slider shoulder defining a second retention throughbore, and wherein the pivoting member comprises a flap of the exhaust nozzle assembly, the flap defining a flap throughbore aligned with the first and second retention throughbores, the flap being pivotally secured to the slider;
b. the slider track defining a slide-way extending between a first lock-slot and a second lock-slot, the first and second lock-slots being defined at opposed first and second edges of the slide-way; and,
c. the slider being secured within each slider track adjacent the slide-way by opposed first and second lock wedges of the slider extending into the first and second lock-slots of the slider track.

8. The connector system of claim 7, wherein a distance of the width axis extending a shortest distance between the opposed first and second strength walls is represented as X, wherein a shortest distance through the first retention throughbore is represented herein by Y, wherein a shortest distance through the flap retention throughbore is represented herein by Z wherein a shortest distance through the second retention throughbore is represented herein by W, and wherein a sum of the distances Y plus Z plus W is between about 60% and about 95% of the distance of X.

9. The connector system of claim 7, wherein the fastener of the rod-and-bracket connector further comprises a receiving bore defined within one of the slider and the flap, the fastener including a securing bolt configured to be selectively secured to and removed from the receiving bore, a bolt throughbore defined within the second section of the L-shaped arm, the securing bolt having a stem and a bolt head, the securing bolt being configured so that the stem passes through the bolt throughbore to be selectively secured to and removed from the receiving bore, and the bolt head being configured to be wider than the bolt throughbore to secure the second section of the L-shaped arm adjacent the receiving bore.

10. The connector system of claim 9, wherein the second section of the L-shaped arm defines a through slot extending from the bolt throughbore to and through a perimeter edge of the second section, so that the through slot defines a longitudinal axis parallel to the longitudinal axis of the rod so that the second section of the L-shaped arm may slide a securing bolt secured to one of the slider and the flap into the through slot, and wherein lock extensions adjacent the through slot extend away from an outer surface of the second section of the L-shaped arm in a direction away from the slider, and wherein the lock extensions are configured to abut the bolt head secured to the securing bolt, so that the lock extensions prevent movement of the rod and L-bracket connector in a direction parallel to the longitudinal axis of the rod whenever the bolt head moves to loosen a connection between the second section of the L-shaped arm and one of the slider and the flap.

11. A rod-and-bracket connector system for connecting a load member to an anchor, the system comprising: a. a rod configured to pass through a retention throughbore defined within a guide shoulder of the anchor and to also pass through a load member throughbore to secure the load member to the shoulder of the anchor; b. an L-shaped arm secured to the rod so that a first section of the L-shaped arm of the connector is secured to an end of the rod that extends beyond one of the retention throughbore of the guide shoulder and the load member throughbore, and so that the first section of the L-shaped arm extends in a direction about perpendicular a longitudinal axis of the rod and also extends a distance sufficient to extend beyond an exterior edge of the anchor; c. the L-shaped arm also being configured so that a second section of the L-shaped arm is secured to a portion of the first section of the L-shaped arm that extends beyond the exterior edge of the anchor, the second section of the L-shaped arm extending in a direction parallel to the longitudinal axis of the rod and also extending adjacent the exterior edge of the anchor; and, d. wherein the second section of the L-shaped arm includes a fastener configured to secure the rod-and-bracket connector to one of the anchor and the load member so that the fastener prohibits the rod from moving out of the guide shoulder throughbore and the load member throughbore.

12. The rod-and-bracket connector system of claim 11, wherein the anchor includes a first wall and an opposed second wall, a width axis extends between the first and second walls, wherein the width axis is a shortest distance between the opposed walls, wherein a longitudinal axis within the retention throughbore of the shoulder and the load member throughbore extends in a direction parallel to the width axis and extends between the opposed first and second walls, and wherein a distance of the width axis extending a shortest distance between the opposed first and second walls is represented as X, a shortest distance through the throughbores defined between the first and second walls is represented by Y, and Y is between about 60% are about 95% of the distance of X.

13. The rod-and-bracket connector system of claim 11, wherein the load member is a pivoting member, the throughbores define cylindrical throughbores, and the rod is cylindrical to permit pivoting movement of the pivoting member relative to the anchor.

14. The rod-and-bracket connector system of claim 11, wherein the fastener of the rod-and-bracket connector further comprises a receiving bore defined within one of the anchor and the load member, the fastener including a securing bolt configured to be selectively secured to and removed from the receiving bore, a bolt throughbore defined within the second section of the L-shaped arm, the securing bolt having a stem and bolt head, the securing bolt being configured so that the stem passes through the bolt throughbore to be selectively secured to and removed from the receiving bore, and the bolt head being configured to be wider than the bolt throughbore to secure the second section of the L-shaped arm adjacent the receiving bore.

15. The rod-and-bracket system of claim 14, wherein the second section of the L-shaped arm defines a through slot extending from the bolt throughbore of the fastener to and through a perimeter edge of the second section, so that the through slot defines a longitudinal axis parallel to the longitudinal axis of the rod so that the securing bolt secured to one of the anchor and the load member into may slide into the through slot within the second section of the L-shaped arm, and wherein at least one lock extension adjacent the through slot extends away from the surface of the second section of the L-shaped arm in a direction away from the anchor, and wherein the lock extension is configured to abut the bolt head secured to the securing bolt, so that the lock extension prevents movement of rod-and-bracket connector in a direction parallel to the longitudinal axis of the rod whenever the bolt head moves to loosen a connection between the second section of the L-shaped arm and one of the guide and the load member.

* * * * *